US008254904B1

(12) United States Patent
Radoshinsky et al.

(10) Patent No.: US 8,254,904 B1
(45) Date of Patent: Aug. 28, 2012

(54) METHOD FOR DISABLING THE AUDIBLE AND VISUAL NOTIFICATIONS THAT ARE PLAYED AND DISPLAYED UPON RECEIVING AN INCOMING MESSAGE

(76) Inventors: Rani Shabtai Radoshinsky, Tel-Aviv (IL); Iris Radoshinsky, Tel-Aviv (IL)

( * ) Notice: Subject to any disclaimer, the term of this patent is extended or adjusted under 35 U.S.C. 154(b) by 0 days.

(21) Appl. No.: 13/363,878

(22) Filed: Feb. 1, 2012

(51) Int. Cl.
*H04W 4/00* (2009.01)
(52) U.S. Cl. ........................................ 455/419; 340/506
(58) Field of Classification Search .................. 455/419, 455/420, 556.1, 557; 340/506, 539.13, 539.11; 379/88.12
See application file for complete search history.

(56) References Cited

U.S. PATENT DOCUMENTS

2008/0102805 A1* 5/2008 Balia et al. ..................... 455/415
2008/0309485 A1* 12/2008 Raduchel ....................... 340/540

* cited by examiner

*Primary Examiner* — Phuoc Doan

(57) ABSTRACT

Upon receiving a message, a recipient communication-device usually plays an audible notification (ringtone), which may disturb the receiving user. The purpose of the method is to prevent, by the sender of the message, the possible disturb. The method enables the sender of the message to disable the notification that is played by the recipient communication-device. The method comprises embedding, by the sending user, a predetermined code in a predetermined location in the message and/or in the number of the recipient communication-device ('predetermined locations'), before sending the message to the recipient communication-device. Then, while delivering the message or upon receiving the message, checking whether the message and/or the number contain the 'predetermined code' in the 'predetermined locations'. In response to finding a presence of the 'predetermined codes' in the 'predetermined locations', disabling the audible notification.

8 Claims, 3 Drawing Sheets

METHOD FOR DISABLING THE AUDIBLE AND VISUAL NOTIFICATIONS THAT ARE PLAYED AND DISPLAYED UPON RECEIVING AN INCOMING MESSAGE

BACKGROUND AND FIELD OF THE INVENTION

The present invention generally is related to messages, such as SMS messages, email messages etc.

More specifically, the present invention is related to the audible notification, that is played by a communication-device (such as a cellular-phone) upon receiving a message, and to the visual notification, that is displayed on the screen of a communication-device, upon receiving a message.

SMS (Short Message Service) is a service that allows a first user to send a textual message using her or his communication-device to a second communication-device of a second user. SMS is well known in the art, and many users of cellular-phones worldwide communicate by sending and receiving SMS messages on a daily basis.

When a communication-device receives a message, it plays an audible notification, in order to draw the user's attention to the new message. The audible notification may be a simple beep sound, or a more complex melody. The audible notification is sometimes called "ringtone". A popular ringtone is the "Gran Vals" ringtone. The "Gran Vals" ringtone is a phrase from the "Gran Vals" composition for solo guitar by Francisco Tarrega, written in 1902. The phrase is taken from the 13th bar to the 16th bar of the composition, as shown in FIG. 3.

In some occasions, the audible notification may disturb the user of the recipient communication-device and the people nearby. For instance, an audible notification played by a cellular-phone during a concert may disturb the audience and the performers.

It is well known that the communication-device may be configured by its user to be on silent mode. However, many users often forget to configure their communication-devices to be on silent mode in advance, before going to sleep, before attending an important meeting, or before attending a concert.

However, current art does not allow the sending user (the user who sends the message) to disable the audible notification of the recipient communication-device (the communication-device that receives the message). Only the user of the recipient communication-device can set, in advance, her or his communication-device to be on silent mode.

What would user A do, if she or he would like to send a message to user B, but suspects that the audible notification, which is played by user B's communication-device, may disturb her or him? Current art does not give a solution to this problem.

In addition, when a communication-device receives a message, it turns on its screen and displays a visual notification about the incoming message, such as : "A new message from Paul!". There are times when the visual notification may disturb. Suppose for instance, that the user of a cellular-phone is sleeping, while the cellular-phone is placed nearby. The light emitted from the screen of the cellular-phone, as a result of the visual notification, may disturb the sleep of the user.

What would user A do, if she or he would like to send a message to user B, but suspects that the light emitted from the screen of user B's communication-device, as a result of the visual notification, may disturb ? Current art does not give a solution to this problem.

SUMMARY OF THE INVENTION

One of the objects of the present invention is to provide a method for disabling, by the sending user and the sending communication-device, the audible notification, that is usually played by the recipient communication-device upon receiving a message.

In order to disable the audible notification, which is usually played upon receiving a message by the recipient communication-device:

(a) The sending user embeds predetermined sign, letter, number, code, word and/or any combinations thereof (hereinafter—'predetermined codes') in predetermined location and/or locations in the message and/or in the number of the recipient communication-device (hereinafter—'predetermined locations'), before sending the message to the recipient communication-device.

(b) Upon receiving the message, the recipient communication-device checks whether the 'predetermined locations' contain the 'predetermined codes'.

(c) In response to finding a presence of the 'predetermined codes' in the 'predetermined locations', the recipient communication-device disables the audible notification.

Another object of the present invention is to provide a similar method for disabling, as well, the visual notification, that is usually displayed upon receiving a message.

BRIEF DESCRIPTION OF THE DRAWINGS

References will now be made to the accompanying drawings, which are not necessarily drawn to scale, and wherein.

DETAILED DESCRIPTION OF THE PREFERRED EMBODIMENTS

One of the objects of the present invention is to provide a method for disabling, by the sending user and the sending communication-device, the audible notification, that is usually played by the recipient communication-device upon receiving a message.

Suppose that Paul and Linda are a husband and wife. One day, Paul went to work very early, before Linda woke up. Paul took Linda's keys from the regular place in the living room, used them to unlock the garage, and after that put them in the study room. When Paul arrived at his office, he wanted to send Linda a message, informing her where he put her keys, such as: "My dear Linda, your keys are in the study room. Paul".

The message is important, but it is not necessary and not desirable to wake Linda up just to inform her where the keys are.

Paul was afraid that the audible notification, which is usually played by Linda's cellular-phone upon receiving a message, would disturb Linda. He is not sure whether Linda's cellular-phone is on silent. Therefore, Paul decided to delay sending the message. However, Paul did not know when to send the message later on, as he did not know when Linda would wake up.

The present invention allows the sender of the message (Paul) to prevent the audible notification, that is usually played by the recipient communication-device (Linda's cellular-phone) upon receiving a message.

Suppose that it is agreed that when a message starts with the word "QUIET", the recipient communication-device does not play an audible notification upon receiving a message. Paul, who does not want to wake Linda up, sends her the following message, which starts with the agreed word ("QUIET" in this example) : "QUIET My dear Linda, your keys are in the study room. Paul".

When the recipient communication-device receives a message, it checks whether the message starts with "QUIET". If the message starts with "QUIET" the recipient communication-device does not play the audible notification.

In our example, Linda's cellular phone does not play its ringtone upon receiving Paul's message.

Since Linda usually checks her cellular-phone shortly after waking up for missed calls, received messages, received emails etc, she notices Paul's message after waking up and before leaving home. Linda reads the message and finds her keys easily and on time.

Figure 1:
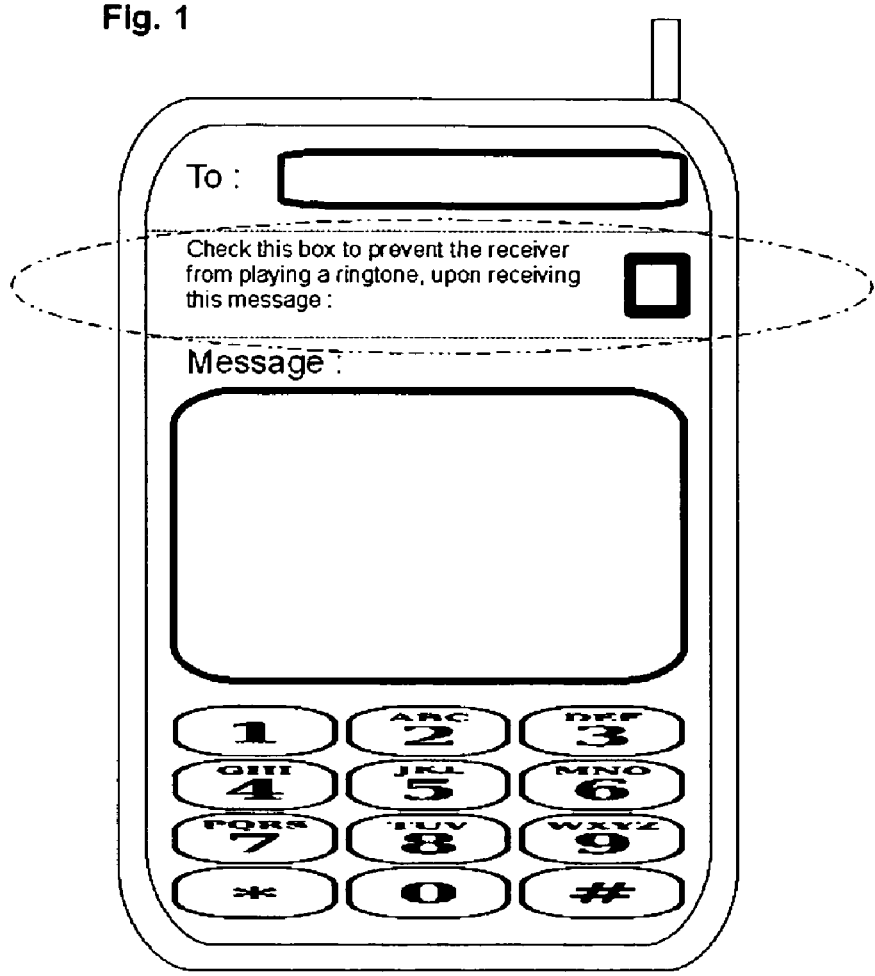
FIG. 1 shows a cellular phone ready for composing a new message by the user. A check box, according to one embodiment of the invention, is shown. The check box allows the user to command her or his cellular phone to embed the necessary the predetermined sign, letter, number, code, word and/or any combinations thereof in the predetermined location and/or locations in the message and/or in the number, in order to disable the audible notification on the receiver's side.

In another embodiment of the present invention, instead of embedding the agreed word by the sending user, the sending user may command her or his sending communication-device to embed the agreed word ("QUIET" in this example). The sending user may do this, for instance, by checking a check box, as shown in FIG. 1. In response to checking the check box, the sending communication-device embeds the agreed word in the message, before sending the message.

Figure 2:
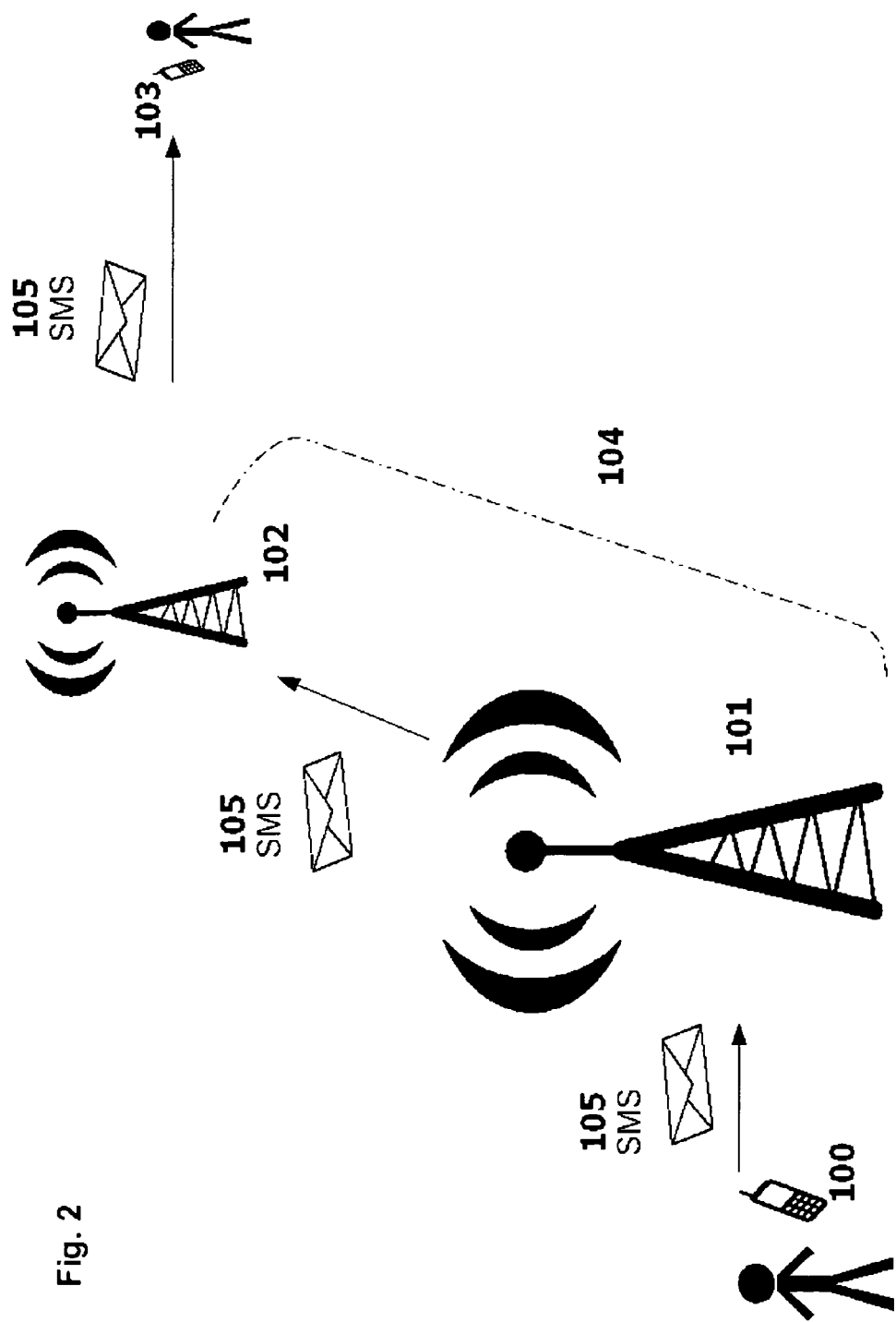
FIG. 2 shows a cellular network, with 2 antennas, delivering a message from a sending communication-device to a recipient communication-device.
Figure 3:
FIG. 3 shows the notes of the "Gran Vals" ringtone.

The transmission-infrastructure is responsible for delivering messages from the sending communication-device to the recipient communication-device. The transmission-infrastructure may be a kind of cellular network, which is widely available in most of the countries in the world. Cellular networks are well known in prior art. A general scheme of a cellular network is shown in FIG. 2.

The cellular network in this example consists of an antenna 101 and an antenna 102. The sending communication-device 100 sends a message 105 to the recipient communication-device 103. Since the sending communication device 100 is far from the recipient communication-device 103, some intermediation is needed to deliver the message 105. Antenna 101 and antenna 102 act as intermediaries. Antenna 101 and antenna 102 are the transmission-infrastructure 104.

The sending communication-device 100 sends the message 105 to the closest antenna nearby, which is antenna 101. Antenna 101 delivers the message to the closest antenna nearby the recipient communication-device 103, which is antenna 102. Finally, antenna 102 sends the message 105 to the final destination, which is the recipient communication-device 103.

Sometimes, the transmission-infrastructure is responsible for sending (to the recipient communication-device) a command to play the audible notification. In one embodiment of the present invention, the transmission-infrastructure checks (instead of the recipient communication-device) whether the message starts with the agreed word ("QUIET" in the example above). If the message starts with "QUIET", the transmission-infrastructure sends to the recipient communication-device a command to disable the audible notification. Alternatively, in another embodiment of the present invention, the transmission-infrastructure refrains from sending a command to play the audible notification.

Another object of the present invention is to provide a method for disabling, by the sending user and the sending communication-device, the visual notification, that is usually displayed and the audible notification, that is usually played by the recipient communication-device upon receiving a message.

Suppose that it is agreed that when a message starts with the code "*931", the recipient communication-device does not play an audible notification and does not display a visual notification upon receiving a message. Paul who does not want to wake Linda up, may send her the following message, which starts with the agreed code ("*931" in this example): "931 My dear Linda, your keys are in the study room. Paul".

When the receiving communication device receives a message, it checks whether the message starts with "931". If the message starts with "*931" the recipient communication-device does not play the audible notification and does not display the visual notification. In our example, Linda's cellular phone does not play its ringtone and does not display a visual notification that emits light.

Alternatively, Paul may command his communication-device to embed the agreed code ("*931" in this example) for him. Paul may do this by checking a check box, similar to the check box seen in FIG. 1. In response to checking the check box, the sending communication-device embeds the agreed code in the message, before sending the message.

In another embodiment of the present invention, when the transmission-infrastructure is responsible for sending to the recipient communication-device a command to play the audible notification and to display the visual notification, the transmission-infrastructure checks (instead of the recipient communication-device) whether the message starts with "*931" (in the example above). If the message starts with "*931", the transmission-infrastructure sends to the recipient communication-device commands to disable both the audible and visual notifications. Alternatively, the transmission-infrastructure refrains from sending commands to play the audible notification and to display the visual notification.

In another embodiment of the present invention, the agreed code is embedded within the number of the recipient communication-device, instead of within the message itself. For instance, Paul embeds the agreed code "*931" within Linda's number : 0506-559775 , like this : *9310506559775. The message itself stays intact: "My dear Linda, your keys are in the study room. Paul".

In another embodiment of the present invention, after receiving a message and disabling the audible and/or the visual notifications, the recipient communication-device checks whether it is moved. Detection of moving may indicate that the user of the recipient communication-device is not sleeping. Therefore, in this embodiment, upon the detecting a movement of the recipient communication-device, it may play and/or display some notification.

Although the present invention and its advantages have been described in detail, it should be understood that various changes, substitutions and alternations can be made herein without departing from the spirit and scope of the invention as defined by the appended claims. Moreover, the scope of the present invention is not intended to be limited to the particular embodiments and steps described in this description.

The invention claimed is:

1. A method for disabling, by a sending user and/or a sending communication-device, one or more notifications, that are usually audibly played and/or visually displayed by a recipient communication-device upon receiving a message, said method comprising the steps of:

(a) encoding predetermined sign, letter, number, code, word and/or any combinations thereof in predetermined location and/or locations in said message and/or in the number of said recipient communication-device, before sending said message to said recipient communication-device;

(b) detecting whether said predetermined sign, letter, number, code, word and/or any combinations thereof are encoded in said predetermined location and/or locations in said message and/or in the number of said recipient communication-device; and (c) disabling said notifications in response to said detecting that said predetermined sign, letter, number, code, word and/or any combinations thereof are encoded in said predetermined location and/or locations in said message and/or in the number of said recipient communication-device.

2. The method of claim 1, wherein said notifications comprise an audible notification and a visual notification.

3. The method of claim 1, wherein said step (b) comprises detecting by a transmission-infrastructure, while delivering said message from said sending communication-device to said recipient communication-device, whether said predetermined sign, letter, number, code, word and/or any combinations thereof are encoded in said predetermined location and/or locations in said message and/or in the number of said recipient communication-device, and wherein said step (c) comprises said transmission-infrastructure sending to said recipient communication-device, a command to disable said notifications, in response to said detecting.

4. The method of claim 1, wherein said step (b) comprises detecting by a transmission-infrastructure, while delivering said message from said sending communication-device to said recipient communication-device, whether said predetermined sign, letter, number, code, word and/or any combinations thereof are encoded in said predetermined location and/or locations in said message and/or in the number of said recipient communication-device, and wherein said step (c) comprises said transmission-infrastructure refraining from sending to said recipient communication-device a command to activate said notifications, in response to said detecting.

5. The method of claim 1, wherein said step (b) comprises detecting, by said recipient communication-device, upon receiving said message, whether said predetermined sign, letter, number, code, word and/or any combinations thereof are encoded in said predetermined location and/or locations in said message and/or in the number of said recipient communication-device.

6. The method of claim 1, wherein said step (a) comprises encoding, by the user of said sending communication-device, said predetermined sign, letter, number, code, word and/or any combinations thereof in predetermined location and/or locations in said message and/or in the number of said recipient communication-device.

7. The method of claim 1, wherein said step (a) comprises the steps of (a1) requesting, by said sending user, to prevent said notifications, and (a2) encoding, by said sending communication-device, in response to said requesting, said predetermined sign, letter, number, code, word and/or any combinations thereof in predetermined location and/or locations in said message and/or in the number of said recipient communication-device.

8. The method of claim 1, further comprising step (d) after step (c), and further comprising step (e) after step (d), wherein step (d) comprises detecting whether said recipient communication-device is moved, and wherein step (e) comprises activating said notifications in response to said detecting that said recipient communication-device is moved.

* * * * *